United States Patent
Ito et al.

(10) Patent No.: US 7,070,732 B2
(45) Date of Patent: *Jul. 4, 2006

(54) METHOD FOR PRODUCING AN OXIDE MAGNETIC MATERIAL

(75) Inventors: Ko Ito, Tokyo (JP); Yukio Takahashi, Tokyo (JP); Takuya Ono, Tokyo (JP); Hiroshi Harada, Tokyo (JP)

(73) Assignee: TDK Corporation, Tokyo (JP)

( * ) Notice: Subject to any disclaimer, the term of this patent is extended or adjusted under 35 U.S.C. 154(b) by 334 days.

This patent is subject to a terminal disclaimer.

(21) Appl. No.: 10/238,727

(22) Filed: Sep. 11, 2002

(65) Prior Publication Data

US 2003/0122288 A1    Jul. 3, 2003

Related U.S. Application Data

(62) Division of application No. 09/641,333, filed on Aug. 18, 2000, now Pat. No. 6,485,840.

(30) Foreign Application Priority Data

| Aug. 19, 1999 | (JP) | ............... 11-232412 |
| Sep. 17, 1999 | (JP) | ............... 11-262934 |
| Sep. 17, 1999 | (JP) | ............... 11-262935 |

(51) Int. Cl.
    *C04B 33/32* (2006.01)

(52) U.S. Cl. ..................... 264/611; 264/658

(58) Field of Classification Search ............ 264/611, 264/678, 681, 658; 241/22, 26, 27, 29, 170
See application file for complete search history.

(56) References Cited

U.S. PATENT DOCUMENTS

| 5,716,565 A | 2/1998 | Stangle et al. | |
| 5,945,902 A | 8/1999 | Lipkes et al. | |
| 6,183,659 B1 | 2/2001 | Murayama et al. | |
| 6,189,202 B1 | 2/2001 | Masuda et al. | |
| 6,485,840 B1 * | 11/2002 | Ito et al. | 428/469 |
| 6,558,807 B1 * | 5/2003 | Ito et al. | 428/472 |

FOREIGN PATENT DOCUMENTS

| CN | 1137156 | 12/1996 |
| JP | 06-181114 | 6/1994 |
| JP | 7-133150 | 5/1995 |
| JP | 2708160 | 10/1997 |

OTHER PUBLICATIONS

Saburou Hori, "Strong Zirconia —Tough Ceramics", Issued from Uchida Roukakuen, Nov. 30, 1990. pp. 57-69.

Ohnishi, Hiroshi, et al., "Zirconia Grinding and Dispersing Media", New Ceramics, vol. 9, No. 5, pp. 31-36 (1996).

* cited by examiner

*Primary Examiner*—Carlos Lopez
(74) *Attorney, Agent, or Firm*—Oblon, Spivak, McClelland, Maier & Neustadt, P.C.

(57) ABSTRACT

An oxide magnetic material comprising main constituents including $Fe_2O_3$, ZnO, CuO and NiO. $Y_2O_3$ of 0.003 to 0.021 wt % and $ZrO_2$ of 0.06 to 0.37 wt % are included in main constituents with respect to all amounts. It is also preferable that Si of 0.010 to 0.0112 wt % is included in main constituents with respect to all amounts. Further, it is also preferable that $Y_2O_3$ of 0.001 to 0.011 wt %, $ZrO_2$ of 0.031 to 0.194 wt %, and Si of 0.010 to 0.056 wt % are included in main constituents with respect to all amounts.

5 Claims, No Drawings

METHOD FOR PRODUCING AN OXIDE MAGNETIC MATERIAL

This application is a divisional of application 09/641,333 filed Aug. 18 2000, now U.S. Pat. No. 6,485,840.

BACKGROUND OF THE INVENTION

1. Field of the Invention

The present invention relates to an oxide magnetic material to be used in various electronic parts, and a chip part formed with the oxide magnetic material and including a bulk-type coil part and an internal conductor for inductance to be used in a high frequency area, as well as a method of producing the oxide magnetic material, and to a method of producing the chip part.

2. Description of the Related Art

Ni—Cu—Zn based ferrite is generally used as an oxide magnetic material such as coil parts and the like to be used in a high frequency area. A powder metallurgical method is general for producing the same. According to this method, oxides such as $Fe_2O_3$, NiO, CuO, ZnO and the like to be starting materials are weighed so as to be predetermined ratios, and are then dry- or wet-mixed and crushed, and this mixed powder is temporarily baked. Subsequently the temporarily baked matter is roughly crushed and is further pulverized. In case the oxide is wet-crushed, the powder is required to be dried. Here, properties of ferrite considerably depend on the composition; therefore, the divergence of composition should be kept extremely small from the viewpoint of production control. Further, material for laminated coil is required to be baked at a lower temperature than the melting point of Ag, and the composition control is required to be at a level of 0.1 mol % of $Fe_2O_3$, NiO, Cuo or ZnO. Especially as to $Fe_2O_3$, reactivity increases as coming near to the stoichiometrical composition of ferrite, but when exceeding it, the reactivity abruptly decreases; therefore, among the main constituents of ferrite, a most serious composition control is needed.

For conventional Ni—Cu—Zn ferrite, stainless steel balls, alumina balls, zirconia balls and other have been used as medium beads in the production process, and crushed with mixing, temporarily baked, roughly crushed and further pulverized. The bulk-type coil material is normally temporarily baked and crashed such that a specific surface area is around 1.0 to 6.0 $m^2/g$. The laminated coil material is, however, crushed for a long time because it is required to be baked at a lower temperature than the melting point of Ag, thereby to increase the specific surface area up to around 3.0 to 15.0 $m^2/g$ to heighten the reactivity of powder at low temperature.

Here, the stainless steel balls have Fe as a main constituent, and due to mechanochemical reaction during crushing, $Fe_2O_3$ which is a main constituent of Ni—Cu—Zn ferrite is increased. The increase of $Fe_2O_3$ changes the composition of Ni—Cu—Zn ferrite and causes a stabilized composition control to be difficult. That is, it is difficult to control the composition with weighed quality values. Other medium beads have a defect in abrasion resistibility, and a defect that abraded powders of the medium beads are mixed into the crushed powder as impurities.

Further, the general medium beads have the inner side of abrasion resistibility which is lower than that of the outer side. Therefore, it causes a divergence in the composition due to the difference in mixing amount of powder produced by abrasion as the production goes on, and it is impossible to obtain stable composition. The crushing for a long time will invite the increase of the amount of the abraded powder, deteriorating the property of baked material. Namely, the abraded powder mixed as impurities will deteriorate the sintering property of Ni—Cu—Zn ferrite, thereby to cause the baking temperature to be high for obtaining the density and permeability of sintered material with the neighborhood of a theoretical density. This will invite a high production cost and decrease of stability in products, and further will make it difficult to bake the sintered material at lower temperature than the melting point of Ag.

The Japanese patent No. 2708160 discloses, for the purpose of reducing the mix of abraded powder at the time of crushing, the use of balls of fully stabilized zirconia (FSZ) of high abrasion resistibility or of partially stabilized zirconia (PSZ) as medium beads for crushing Mn—Zn based ferrite. According to the method of this patent document, the zirconia balls of a diameter 0.5 to 3.0 mm are used as medium beads in the pulverizing process to extremely prevent impurities from being mixed, thereby to suppress the mixing amount to be less than 0.02 wt % relative to the main constituent. It is described in this patent document that with this method, the powder may be sintered at temperature lower by about 100 to 200° C. (that is, at approximately 1000° C.) in contrast to the temporarily baking temperature of 1200° C. or higher of the conventional art to obtain the sintered material with the neighborhood of theoretical density, thus to industrially lower the sintering temperature and reduce the production cost. Further, JP-A-7-133150 discloses a sample having ZrO of 0.01 to 3.0 wt % relative to the main constituent of Ni—Cu—Zn ferrite and baked at the temperature of 1100° C. for 1.5 hours for the purpose of providing a magnetic material of high mechanical strength.

However, the baking temperature of approximately 1000° C. described in the Japanese patent No. 2708160 will not actually reduce the baking cost and will not be adapted to the simultaneous baking with Ag of melting point of approximately 960° C. The baking temperature of approximately 1100° C. as described in JP-A-7-133150 will be further impossible for the simultaneous baking with Ag.

Further, according to the production method of the Japanese patent 2708160, medium beads of small diameter are used to reduce the amount of impurities mixed into the material due to the abrasion of the medium beads, and the temporarily baked material is crushed, taking a long time, for example, 196 hours. Therefore, the ball efficiency ([material processing amount]/[ball weight]), that is, the crashing efficiency is bad.

SUMMARY OF THE INVENTION

In consideration of the above mentioned problems, it is an object of the invention to provide an oxide magnetic material which can be subjected to a low temperature baking with holding sintering property and permeability and shortening the crushing time, and to provide a chip part formed by use of the same. In addition, it is also an object of the invention to provide a method of producing the oxide magnetic material and a method of producing the chip part.

According to a first aspect of the invention, the oxide magnetic material is characterized by containing $Fe_2O_3$, ZnO, CuO and NiO as main constituents, and further containing $Y_2O_3$ of 0.003 to 0.021 wt % and $ZrO_2$ of 0.06 to 0.37 wt % in the main constituents with respect to all amounts.

As additives to the main constituents, it is also preferable that the oxide magnetic material further contains Si of 0.010 to 0.112 wt % (including the cases where Si is contained as silicon oxide) in the main constituents with respect to all amounts.

Further, as additives to the main constituents, it is also preferable that the oxide magnetic material further contains $Y_2O_3$ of 0.001 to 0.011 wt %, $ZrO_2$ of 0.03 to 0.194 wt %, and Si of 0.010 to 0.056 wt % (including the cases where Si is contained as silicon oxide) in the main constituents with respect to all amounts.

So far as giving no influence to the properties such as the permeability or the density of the baked material, Si, P, Al, B, Mn, Mg, Co, Ba, Sr, Bi, Pb, W, V, Mo and the like may be included as impurities. For obtaining a permeability higher than a predetermined value, the composition of main constituents is preferably $Fe_2O_3$ of 40 to 51 mol %, ZnO of 1 to 34 mol %, CuO of 1 to 30 mol % and the balance being NiO. More preferably, $Fe_2O_3$ is 46 to 50 mol %, ZnO is 32 to 34 mol %, CuO is 9 to 11 mol % and NiO is 8 to 11 mol %.

In case the partially stabilized zirconia ball (PSZ) containing $Y_2O_3$ is used to crush the temporarily baked powder, it is known that the partly stabilized zirconia ball having $Y_2O_3$ containing about 3 mol % is most excellent in hardness and destructive toughness value (Strong Zirconia-Tough Ceramics, written by HORI, Saburou, issued from Uchida Roukakuen). For trying to obtain the crushed powder of average particle diameter of approximately 0.1 to 1.0 μm, if the composition is $Y_2O_3$ of less than 0.003 wt % and $ZrO_2$ of less than 0.06 wt %, it is required to crush the powder, delaying an agitating rate and taking a long time. However, if the composition is more than these weight percents, the crushing efficiency may be heightened and the crushing is possible at a shorter time, though depending on the size of ball diameter and agitating rate. On the other hand, if $Y_2O_3$ exceeds 0.021 wt % and $ZrO_2$ exceeds 0.37 wt %, it is difficult to obtain an apparent density of 5.0 g/cm$^3$ or more which is said to be not problematical about the physical strength at 920° C. where a simultaneous baking with Ag is possible. Therefore, the baking temperature should be raised in order to secure the apparent density. Further, if $Y_2O_3$ exceeds 0.021 wt % and $ZrO_2$ exceeds 0.37 wt %, the permeability may be deteriorated.

In the case where the oxide magnetic material further contains Si as additives to the main constituents, for trying to obtain the crushed powder of average particle diameter of approximately 0.1 to 1.0 μm, if the composition is Si of less than 0.010 wt %, it is required to crush the powder, delaying an agitating rate and taking a long time. However, if the composition is more than these weight percents, the crushing efficiency may be heightened and the crushing is possible at a shorter time, though depending on the size of ball diameter and agitating rate. On the other hand, if Si exceeds 0.112 wt %, it is difficult to obtain an apparent density of 5.0 g/cm$^3$ or more which is said to be not problematical about the physical strength at 920° C. where a simultaneous baking with Ag is possible. Therefore, the baking temperature should be raised in order to secure the apparent density. Further, if Si exceeds 0.112 wt %, the permeability may be deteriorated.

In the case where the oxide magnetic material further contains $Y_2O_3$, $ZrO_2$, and Si as additives to the main constituents, for trying to obtain the crushed powder of average particle diameter of approximately 0.1 to 1.0 μm, if the composition is $Y_2O_3$ of less than 0.001 wt % and $ZrO_2$ of less than 0.031 wt %, and Si of less than 0.010 wt %, it is required to crush the powder, delaying an agitating rate and taking a long time. However, if the composition is more than these weight percents, the crushing efficiency may be heightened and the crushing is possible at a shorter time, though depending on the size of ball diameter and agitating rate. On the other hand, if $Y_2O_3$ exceeds 0.011 wt % and $ZrO_2$ exceeds 0.37 wt % and Si exceeds 0.056 wt %, respectively, it is difficult to obtain an apparent density of 5.0 g/cm$^3$ or more which is said to be not problematical about the physical strength at 920° C. where a simultaneous baking with Ag is possible. Therefore, the baking temperature should be raised in order to secure the apparent density. Further, if $Y_2O_3$ exceeds 0.011 wt % and $ZrO_2$ exceeds 0.194 wt % and Si exceeds 0.056 wt %, the permeability may be deteriorated.

A chip part according to a second aspect of the invention is characterized by using a sintered material of the oxide magnetic material which is described in the first aspect of the invention so as to be formed as a bulk-type coil part.

As the chip part according to the second aspect is composed by using the oxide magnetic material which is defined in the first aspect of the invention, the chip part is baked at a low temperature and is provided at a low cost while sufficiently coping with the one baked at a high baking temperature with respect to the strength and permeability.

A chip part according to a third aspect of the invention is characterized by using the sintered material of the oxide magnetic material according to the first aspect, and having an electric conductor layer in the sinteredmaterial, the chip part having a laminated coil part or partly having the laminated coil part.

The chip part according to a fourth aspect of the invention is characterized in that an internal conductor has Ag or an alloy of Ag and Pd as a main constituent in the tip part according to the third aspect.

As the chip part according to the third and fourth aspect of the invention is formed by use of the oxide magnetic material according to the first aspect, the chip part has substantially the same strength and permeability as the chip part according to the second aspect, and further can be baked simultaneously with Ag and the alloy of Ag—Pd.

A fifth aspect of the invention is that a method for producing the oxide magnetic material according to the first aspect, characterized in that medium beads of partially stabilized zirconia are used at a time of mixing and crushing raw material and at a time of crushing a temporarily baked material, and $Y_2O_3$ of 0.003 to 0.021 wt % and $ZrO_2$ of 0.06 to 0.37 wt % is contained therein with respect to all amounts in the oxide magnetic material by wear of the medium beads.

Thus, if the partially stabilized zirconia balls is used to crush the material after being temporarily baked, it is possible to eliminate the difficult problem in the composition control as using the conventional stainless steel balls or the like. Further, since $Y_2O_3$ and $ZrO_2$ are mixed into the material through the crushing process, the process for weighing and mixing the constituent into the material may be eliminated.

In the fifth aspect of the invention, it is also preferable that silicon nitride is used as medium beads and that Si of 0.010 to 0.112 wt % is contained with respect to all amounts in the oxide magnetic material by wear of the medium beads.

Thus, if the silicon nitride balls are used to crush the material after being temporarily baked, it is possible to eliminate the difficult problem in the composition control as using the conventional stainless steel balls or the like. Further, since Si is mixed into the material through the crushing process, the process for weighing and mixing the constituent into the material may be eliminated.

Further, in the fifth aspect of the invention, it is also preferable that partially stabilized zirconia and silicon nitride are used as medium beads at a time of mixing and crushing raw material and at a time of crushing a temporarily baked material by means of the media agitating mill of the wet internal circulation type. By wear of the medium beads, $Y_2O_3$ of 0.001 to 0.011 wt %, $ZrO_2$ of 0.03 to 0.194 wt %, and Si of 0.010 to 0.056 wt % are contained with respect to all amounts in the oxide magnetic material.

Thus, if balls of partially stabilized zirconia and silicon nitride are used to crush the material after being temporarily baked, it is possible to eliminate the difficult problem in the composition control as using the conventional stainless steel balls or the like. Further, since $Y_2O_3$, $ZrO_2$, and Si are mixed into the material through the crushing process, the process for weighing and mixing the constituent into the material may be eliminated.

Moreover, in the fifth aspect of the present invention, it is preferable that the volume ratio of the silicon nitride beads is in the range between 20% and 99% with respect to the total amount of partially stabilized zirconia beads and silicon nitride beads.

Due to the above ratio of partially stabilized zirconia beads and silicon nitride beads, mixing of $ZrO_2$ and $Y_2O_3$, which are main constituents of partially stabilized zirconia beads, is further facilitated by means of wear of the medium beads, compared with the case where only partially stabilized zirconia beads are used to crush the material.

According to a sixth aspect of the invention, a method for producing the oxide magnetic material in the fifth aspect is characterized by using material as medium beads having diameter of 0.2 to 5 mm.

In the case where the medium beads are of a diameter less than 0.2 mm, the crushing efficiency is lowered. On the other hand, in the case where the diameter exceeds 5 mm, the powder will not be sufficiently pulverized, and the sintering temperature will become high for obtaining a density of sintered material with the neighborhood of theoretical density and the permeability will be deteriorated.

According to a seventh aspect of the invention, a method for producing the oxide magnetic material in the fifth or sixth aspect is characterized in that agitating rate of the medium beads is 2.0 to 8.0 m/s.

In the cage where the agitating rate of the medium beads is lower than 2.0 m/s, it will take a long time to crush the material until a desired specific surface area is obtained. This is not reasonable in consideration of the lead time pertaining to the production of material. On the other hand, if exceeding 8.0 m/s, the abrasion of beads is increased, and the baking temperature becomes high for obtaining the density of a sintered material with the neighborhood of the theoretical density and a desired permeability, inviting the increase of production cost, the lowering of stabilization of products, and further making it difficult to bake the material at a temperature lower than the melting point of Ag.

According to an eighth aspect of the invention, the method in one of fifth to seventh aspects is characterized by obtaining powders of specific surface area of 6.0 to 15.0 $m^2/g$ by crushing from the material after having been temporarily baked.

In the case where the specific surface area is less than 6.0 $m^2/g$, the baking temperature becomes high for obtaining the density of the sintered material in the neighborhood of the theoretical density, inviting the deterioration of the permeability. In the case where it is more than 15.0 $m^2/g$, the crushing time will be long.

According to a ninth aspect of the invention, the method in the third or fourth aspect is characterized by forming an oxide magnetic material crushed by medium beads and an internal conductor and by baking at a certain temperature range. If partially stabilized zirconia is used as medium beads, the temperature range is between 880 and 920° C. If silicon nitride is used as medium beads, the temperature range is between 910 and 920° C. If partially stabilized zirconia and silicon nitride are used as medium beads, the temperature range is between 910 and 920° C.

In the case where the baking temperature is lower than the above range, the sintering is insufficient. In the case where exceeding the above range, the electrode material is diffused in ferrite to extremely deteriorate the magnetic property of chip. In this method, the baking time is about 5 minutes to 3 hours.

DETAILED DESCRIPTION OF PREFERRED EMBODIMENTS

The oxide magnetic material for a bulk-type coil part or a laminated coil part or other electronic parts according to the invention is a ferrite material containing the main constituents of $Fe_2O_3$, ZnO, NiO, and CuO, and containing, if needed, the slight amounts of weighed additives such as Si, P, Al, B, Mn, Mg, Co, Ba, Sr, Bi, Pb, W, V, Mo and the like, and further containing, as sub-constituents, $ZrO_2$ and $Y_2O_3$ which are mixed into the material due to abrasion of partially stabilized zirconia balls as the medium beads. It is also preferable that the ferrite material further contains, as sub-constituents, Si which is mixed into the material due to abrasion of silicon nitride balls as the medium beads. Furthermore, it is also preferable that the ferrite material further contains, as sub-constituents, $ZrO_2$, $Y_2O_3$, and Si which are mixed into the material due to abrasion of partially stabilized zirconia balls and silicon nitride balls as the medium beads. With adjustment of the particle size of the medium beads, agitating rate, agitating time at time of crushing raw materials and at time of crushing the material after being temporarily baked, the mixing amount of the medium beads is adjusted, and the baking temperature is not required to be heightened. Therefore, the baking may be available at temperature lower than the melting point of Ag.

The materials weighed as mentioned above are mixed and crushed by means of the media agitating mill of the wet internal circulation type with at least one of the partially stabilized zirconia balls and silicon nitride balls as the medium beads. Subsequently, the crushed material is temporarily baked and crushed by means of the media agitating mill of the wet internal circulation type with the partially stabilized zirconia balls as the medium beads, thereby to obtain the oxide magnetic material.

A core for the bulk-type coil is made up by adding a binder to the oxide magnetic material produced as mentioned above and is granulated, followed by molding into a predetermined shape, processed and baked at 900 to 1300° C. in the air. The core may be processed after baking. The core is made by winding a wire therearound, the wire being of Au, Ag, Cu, Fe, Pt, Sn, Ni, Pb, Al, Co or an alloy thereof.

On the other hand, the laminated coil is normally produced by laminating into one body a paste of the magnetic layer of the oxide magnetic material and an internal conductor layer by means of a thick filming technique (printing process or the doctor blade method), then baking, subsequently printing the thus obtained sintered material on the surface thereof with a paste of an external electrode and baking. The internal conductor paste contains normally an electrically conductive element, a binder and a solvent. The material for the electrically conductive element is preferred to be an alloy of Ag—Pd for a reason of increasing the quality coefficients Q of inductor. The baking condition and baking atmosphere may be appropriately determined in consideration of the property and other of the magnetic material and electrically conductive element, and the baking temperature is preferred to be approximately 800 to 950° C. More preferably, the baking temperature is about 880 to 920° C. in the case where the partially stabilized zirconia balls are used as medium beads and about 910 to 920° C. in the case where silicon nitride balls or both the partially stabilized zirconia balls and silicon nitride balls are used.

EXAMPLE 1

Now, a first example of the preferred embodiments is described hereinafter.

(Weighing and Crushing)

The composition of NiO 8.7 mol %, CuO 10.0 mol %, ZnO 32.0 mol %, and $Fe_2O_3$ 49.3 mol % as the main constituent of Ni—Cu—Zn ferrite was wet-mixed with partially stabilized zirconia (PSZ) of 3 mm in diameter as medium beads by means of the media agitating mill of the wet internal circulation type, and was dried, followed by temporarily baking at 800° C. Subsequently, the temporarily baked material was pulverized by means of the media agitating mill of the wet internal circulation type by use of PSZ as medium beads and with the density of the temporarily based material being 33% as shown in Table 1 in that the agitating rate, crushing time and ball diameter were varied as parameters as shown in the left end column of Table 1.

Namely, as to the samples 1 to 9, the diameter of medium beads was 3 mm, and, the agitating rates were varied as 1 m/s, 2.0 m/s, 4.0 m/s, 4.3 m/s, 5.0 m/s, 6.0 m/s, 7.0 m/s, 8.0 m/s, and 10 m/s such that the average particle diameters of the materials were 0.5 μm, that is, the specific surface area were 8 $m^2/g$, while in connection with the respective agitating rates, the crushing times were varied as 76 hours, 67 hours, 45 hours, 38 hours, 33 hours, 23 hours, 17 hours, 10 hours, and 2 hours. Those were made the samples 1 to 9, in which all the powders with particles of 0.5 μm in average diameter and with specific relative surface area of 8 $m^2/g$ were obtained.

As to the samples 10 to 13, the diameter of the ball was 3 mm and the agitating rate was 4 m/s while the crushing times were varied as 1 hour, 1.5 hours, 93 hours, and 108 hours, and the powders of average particles being 2.0 μm, 1.5 μm, 0.3 μm, 0.2 μm, and the specific surface areas being 2 $m^2/g$, 2.5 $m^2/g$, 15 $m^2/g$, and 17 $m^2/g$ were obtained.

As to the samples 14 to 16, the agitating rate was 4 m/s and the crushing time was 45 hours constant while diameters of the balls were varied as 0.2 mm, 5 mm, and 12 mm, and the powders of average particles being 0.6 μm, 0.7 μm, and 1.4 μm, and relative surface areas being 7 $m^2/g$, 6 $m^2/g$, and 3 $m^2/g$ were obtained respectively.

Further, for the purpose of comparison, the tests were carried out as to the conventional samples 17 to 19. The sample 17 contained the main constituents of NiO 9.5 mol %, CuO 10.5 mol %, ZnO 34.0 mol %, and $Fe_2O_3$ 46.0 mol %. The crushing machine was the media agitating mill of the wet internal circulation type. The balls were 3 mm in diameter and made of stainless steel. The agitating rate and crushing time were predetermined so that the average particle diameter of 0.5 μm and the specific surface area of 8 $m^2/g$ might be obtained as in the case of the samples 1 to 9.

The sample 18 was of the main constituents such as used in the samples 1 to 16. The crushing machine was the media agitating mill of the wet internal circulation type. The balls were 3 mm in diameter and made of titania. The agitating rate and the crushing time were determined so that the average particle diameter of 0.5 μm and the specific surface area of 8 $m^2/g$ might be obtained as in the samples 1 to 9.

The sample 19 was of the main constituents of NiO 9.5 mol %, CuO 10.5 mol %, ZnO 34.0 mol %, and $Fe_2O_3$ 46.0 mol %. The crushing machine was the ball mill. The balls were 3 mm in diameter and made of the stainless steel. The powder of average particles 0.3 μm, and the specific surface area 12 $m^2/g$ was obtained. As to the samples 17 to 19, mixing and crushing before the temporarily baking of the raw material were carried out in wet by means of the respective media.

Impurities and mixing amount thereof in the materials shown in Table 1 and the quantitative analysis of the main constituents after production shown in Table 2 were measured by the fluorescent X-rays analysis method. The specific surface area was measured by means of Flow Soap 2300-type which is Automatic Measuring Instrument For Specific Surface Area of Fluidization Type of (K. K.) Shimazu Seisakusyo. The average particle diameter was measured by the laser diffraction and scattering method of Microtrack HRA9320-X100-type of HONEWELL.

(Production of Test Samples for Measuring Permeability and Density of Sintered Materials)

10 wt parts of 3% water solvent of PVA124 was added as a binder to the materials shown in the samples 1 to 19 to make particles. Then, the materials were molded into predetermined shapes under the measuring conditions as later described and were baked for 2 hours in the air at the temperatures 870° C., 880° C., 910° C., 920° C., 940° C., 1000° C., and 1100° C.

(Evaluation)

The core materials were evaluated with respect to the crushing time until desired relative surface area were obtained, the confirmation of impurities which might be considered to have been mixed due to abrasion of the medium beads, the divergence in the composition of the main constituents of $Fe_2O_3$ ZnO, CuO, and NiO, the initial permeability shown in Table 3, and the apparent densities shown in Table 4. The initial permeability was measured by molding the material into a toroidal shape of 18 mm outer diameter, 10 mm inner diameter, 3.1 mm height, baking the molded material at a predetermined temperature in the air, forming a coil by winding a wire 20 times around the baked material, applying a field of 0.4 A/m by means of Impedance Analyzer (4291A made by Hullet Packard), measuring the inductance of 100 kHz, and calculating the constants obtained from the shape.

The apparent density was sought by calculating a volume with the dimensions of sintered material, and dividing the mass by the volume. Herein, the apparent density was for evaluating the sintered condition of the sintered material. If the apparent density is low, the sintered material has many air halls contained therein. If such a material is used as an element, the air hall causes to affect influences to reliability as a short-circuit and further lack the physical strength by using at high temperature and humidity. The apparent density free of such problems is generally 5.0 $g/cm^3$ or higher which is 95% or higher of the theoretical density (5.3 to 5.5 $g/cm^3$) of Ni—Cu—Zn ferrite.

TABLE 1

| | | Crushing machine | Ball materials | Ball diameter (mm) | Agitating rate (m/s) | Crushing time (hr) | Average grain diameter (μm) | Specific area (m²/g) | Main impurities and mixing amounts (wt %) | | | | | | |
|---|---|---|---|---|---|---|---|---|---|---|---|---|---|---|---|
| | | | | | | | | | $ZrO_2$ | $Y_2O_3$ | $Fe_2O_3$ | $TiO_2$ | $Al_2O_3$ | $SiO_2$ | $MoO_3$ |
| Crushing rate | Sample 1 | A* | PSZ | 3 | 1.0 | 76 | 0.5 | 8 | 0.01 | 0.001 | — | — | — | — | — |
| | Sample 2 | A | PSZ | 3 | 2.0 | 67 | 0.5 | 8 | 0.06 | 0.003 | — | — | — | — | — |
| | Sample 3 | A | PSZ | 3 | 4.0 | 45 | 0.5 | 8 | 0.12 | 0.007 | — | — | — | — | — |
| | Sample 4 | A | PSZ | 3 | 4.3 | 38 | 0.5 | 8 | 0.15 | 0.008 | — | — | — | — | — |
| | Sample 5 | A | PSZ | 3 | 5.0 | 33 | 0.5 | 8 | 0.17 | 0.011 | — | — | — | — | — |
| | Sample 6 | A | PSZ | 3 | 6.0 | 23 | 0.5 | 8 | 0.22 | 0.012 | — | — | — | — | — |
| | Sample 7 | A | PSZ | 3 | 7.0 | 17 | 0.5 | 8 | 0.31 | 0.016 | — | — | — | — | — |
| | Sample 8 | A | PSZ | 3 | 8.0 | 10 | 0.5 | 8 | 0.37 | 0.021 | — | — | — | — | — |
| | Sample 9 | A | PSZ | 3 | 10.0 | 2 | 0.5 | 8 | 0.60 | 0.031 | — | — | — | — | — |
| Crushing Time | Sample 10 | A | PSZ | 3 | 4.0 | 1 | 2.0 | 2 | 0.02 | 0.001 | — | — | — | — | — |
| | Sample 11 | A | PSZ | 3 | 4.0 | 1.5 | 1.5 | 2.5 | 0.02 | 0.001 | — | — | — | — | — |
| | Sample 12 | A | PSZ | 3 | 4.0 | 93 | 0.3 | 15 | 0.24 | 0.014 | — | — | — | — | — |
| | Sample 13 | A | PSZ | 3 | 4.0 | 108 | 0.2 | 17 | 0.27 | 0.016 | — | — | — | — | — |
| Ball diameter | Sample 14 | A | PSZ | 0.2 | 4.0 | 45 | 0.6 | 7 | 0.10 | 0.006 | — | — | — | — | — |
| | Sample 15 | A | PSZ | 5 | 4.0 | 45 | 0.7 | 6 | 0.17 | 0.010 | — | — | — | — | — |
| | Sample 16 | A | PSZ | 12 | 4.0 | 45 | 1.4 | 3 | 0.60 | 0.035 | — | — | — | — | — |
| Conventional example | Sample 17 | A | Stainless steel | 3 | 5.0 | 20 | 0.5 | 8 | — | — | 8.12 | — | — | 0.015 | 0.002 |
| | Sample 18 | A | Titania | 3 | 5.0 | 38 | 0.5 | 8 | — | — | — | 0.88 | 0.22 | 0.061 | 0.003 |
| | Sample 19 | B* | Stainless steel | 3 | | 192 | 0.3 | 12 | — | — | 8.63 | — | — | 0.020 | 0.004 |

*A: Wet internal circulation media agitating mill
B: Ball mill

TABLE 2

Weighed quality values and change of composition after production

| | Weighed quality | | | | Completion | | | |
|---|---|---|---|---|---|---|---|---|
| | $Fe_2O_3$ | ZnO | NiO | CuO | $Fe_2O_3$ | ZnO | NiO | CuO |
| Sample 1 | 49.3 | 32.0 | 8.7 | 10.0 | 49.21 | 32.07 | 8.73 | 9.99 |
| Sample 2 | 49.3 | 32.0 | 8.7 | 10.0 | 49.22 | 32.05 | 8.78 | 9.95 |
| Sample 3 | 49.3 | 32.0 | 8.7 | 10.0 | 49.21 | 32.06 | 8.77 | 9.96 |
| Sample 4 | 49.3 | 32.0 | 8.7 | 10.0 | 49.26 | 32.04 | 8.72 | 9.98 |
| Sample 5 | 49.3 | 32.0 | 8.7 | 10.0 | 49.22 | 32.08 | 8.72 | 9.98 |
| Sample 6 | 49.3 | 32.0 | 8.7 | 10.0 | 49.23 | 32.05 | 8.76 | 9.96 |
| Sample 7 | 49.3 | 32.0 | 8.7 | 10.0 | 49.25 | 32.06 | 8.71 | 9.98 |
| Sample 8 | 49.3 | 32.0 | 8.7 | 10.0 | 49.26 | 32.04 | 8.71 | 9.99 |
| Sample 9 | 49.3 | 32.0 | 8.7 | 10.0 | 49.28 | 32.05 | 8.72 | 9.95 |
| Sample 10 | 49.3 | 32.0 | 8.7 | 10.0 | 49.21 | 32.05 | 8.78 | 9.96 |
| Sample 11 | 49.3 | 32.0 | 8.7 | 10.0 | 49.23 | 32.04 | 8.78 | 9.95 |
| Sample 12 | 49.3 | 32.0 | 8.7 | 10.0 | 49.25 | 32.06 | 8.75 | 9.94 |
| Sample 13 | 49.3 | 32.0 | 8.7 | 10.0 | 49.28 | 32.04 | 8.72 | 9.96 |
| Sample 14 | 49.3 | 32.0 | 8.7 | 10.0 | 49.26 | 32.06 | 8.71 | 9.97 |
| Sample 15 | 49.3 | 32.0 | 8.7 | 10.0 | 49.28 | 32.04 | 8.72 | 9.96 |
| Sample 16 | 49.3 | 32.0 | 8.7 | 10.0 | 49.29 | 32.03 | 8.70 | 9.98 |
| Sample 17 | 46.0 | 34.0 | 9.5 | 10.5 | 49.02 | 32.10 | 8.97 | 9.91 |
| Sample 18 | 49.3 | 32.0 | 8.7 | 10.0 | 49.34 | 31.90 | 8.73 | 9.92 |
| Sample 19 | 46.0 | 34.0 | 9.5 | 10.5 | 49.20 | 31.99 | 8.94 | 9.88 |

(Results of Evaluation)

[Mix of Impurities]

In the case where a desired specific surface area is 8 m²/g as in samples 1 to 9 in Table 1, the crushing time is shortened as the agitating rate increases. It is, therefore, understood that the agitating rate is increased to heighten the crushing efficiency. However, the increasing of the agitating rate increases the abrasion amount of the medium beads. As to PSZ, the main constituents $ZrO_2$ and $Y_2O_3$ are mixed into the material, but mixture of other constituents is not recognized.

On the other hand, as to the samples 17 and 18 of the conventional examples, when comparing with the sample 5 of the same ball diameter and agitating rate with respect to the pulverizing time and the abrasion amount of the balls, in the case of the sample 17, namely in the case of the stainless steel, the crushing time is shortened more than the case of PSZ and the crushing efficiency is very high, but the abrasion quantity is very much as about 45 times of PSZ. The sample 18, namely the case of titania, the abrasion amount is about 6.5 times of PSZ.

[Divergence in the Composition Due to Mixed Impurities]

Table 2 shows the divergences of the composition of the material from weighing $Fe_2O_3$, ZnO, CuO, and NiO as the main constituents, the materials having been mixed, crushed, temporarily baked and pulverized. These are the results of the quantitative analysis of the respective oxides. As is seen in Table 2, in the case where the stainless steel is used for medium beads as the samples 17 and 19, the divergence of $Fe_2O_3$ is remarkable from weighing to completion, and in Ni—Cu—Zn ferrite, the composition of $Fe_2O_3$ which requires a most serious control, increases by 3 mol % or higher from the weighing to the completion. Further since the stainless steel is different in hardness as to the outer part and inner part, the medium beads used for a long time will cause a difference in the mixed amount of $Fe_2O_3$. This indicates the difficulty of the composition control.

[Relation Between Crushing Time and Relative Surface Area]

Further as is understood from the samples 10 to 13, the specific surface area is increased by prolonging the crushing time.

[Relation Between Diameters of Balls and Relative Surface Area]

Further as shown in the samples 3, 14, 15 and 16 wherein the agitating rate and crushing time are constant, in the case of the same agitating rate and the same pulverizing time, the surface area of the powder where the ball diameter is 3 mm is largest and the crushing efficiency is high. It is generally known that the crushing efficiency becomes higher as the ball diameter is smaller. This is, however, the case that a rough crushing process intervenes, and in the example where the rough crushing is not sufficient, it can be seen that the ball of 3 mm in diameter will exhibit a highest crushing efficiency. If a ball mill is used as in the sample 19, the specific surface area is able to be 12 $m^2/g$ with the crushing for a long time as 192 hours. However, this requires a crushing time more than twice of the sample 12 where the wet internal circulation media agitating mill is operated at the agitating rate 4 m/s. Moreover, in the case of the sample 19, it can be seen that the specific surface area is small and the crushing efficiency of the ball mill is low.

[Initial Permeability and Apparent Density]

It can be seen that the permeability shown in Table 3 is in relation to the apparent densities shown in Table 4. Namely, in the samples 9 to 11, 16, and 18 where the permeability is relatively low, the apparent density is also low. In the samples 1 to 9, PSZ ball of 3 mm in diameter was used as the medium beads and the wet internal circulation media agitating mill was operated to vary the agitating rate for obtaining the specific surface area 8 $m^2/g$, but both of the permeability and the density of the sintered material were deteriorated when the agitating rate was heightened. This is because the increase of mixing amount of $ZrO_2$ and $Y_2O_3$ which are constituents of PSZ contributes to the deterioration of the material property. However, in the case where the baking temperature is 1100° C., the difference is small and almost equivalent. However, in the case where the baking temperature is 940° C. or lower, the difference will increase.

Further, it is seen that, comparing with the sample 19 which is under the conventional conditions, this property is deteriorated in the case where the agitating rate exceeds 6 m/s, the mixing amount of $ZrO_2$ exceeds 0.22 wt %, and $Y_2O_3$ exceeds 0.012 wt %. An extremely excellent property may be obtained compared with the conventional one so long as these areas are not exceeded. Further, the material may be baked at the temperature 920° C., that is, lower than the melting point of Ag. However, even if exceeding the value and so long as the mixing quantity of $ZrO_2$ did not exceed 0.37 wt %, and the mixing quantity of $Y_2O_3$ does not exceed 0.021 wt %, the apparent density of 5 $g/cm^3$ or more was obtained at the baking temperature 920° C. as shown in the sample 8.

[Agitating Rate]

Samples where the apparent density 5.0 $g/cm^3$ or more is secured by sintering at 920° C. or lower which is suited to the simultaneous baking with Ag, are the samples 1 to 8, 12 to 15, 17 and 19. In the case of the sample 9, the agitating rate is 10 m/s, and in this case, even if the average particle diameter and relative surface area are the same as the samples 1 to 8, because the mixing amount of $ZrO_2$ and $Y_2O_3$ is too much, the apparent density 5.0 $g/cm^3$ or more cannot be obtained in spite of being at 940° C. Further, in the case of the sample 1, the agitating rate is 1 m/s and since it takes 76 hours until the specific surface area comes to 8.0 $m^2/g$, this is not desirable. Therefore, a preferred agitating rate is 2.0 to 8.0 m/s.

TABLE 3

Measuring results of initial permeability

|  | 870° C. | 880° C. | 910° C. | 920° C. | 940° C. | 1000° C. | 1100° C. |
|---|---|---|---|---|---|---|---|
| Sample 1 | 351 | 592 | 981 | 1230 | 1695 | 2085 | 2120 |
| Sample 2 | 365 | 602 | 1002 | 1245 | 1700 | 2093 | 2102 |
| Sample 3 | 360 | 592 | 984 | 1235 | 1691 | 2100 | 2103 |
| Sample 4 | 349 | 574 | 950 | 1200 | 1650 | 2050 | 2100 |
| Sample 5 | 349 | 574 | 910 | 1100 | 1550 | 2030 | 2099 |
| Sample 6 | 334 | 550 | 850 | 950 | 1400 | 1890 | 2100 |
| Sample 7 | 280 | 450 | 700 | 850 | 1200 | 1600 | 2050 |
| Sample 8 | 202 | 350 | 631 | 780 | 1053 | 1450 | 2030 |
| Sample 9 | 150 | 230 | 350 | 420 | 540 | 700 | 1250 |
| Sample 10 | 120 | 200 | 250 | 350 | 420 | 500 | 1230 |
| Sample 11 | 160 | 230 | 360 | 430 | 560 | 720 | 1300 |
| Sample 12 | 360 | 600 | 1000 | 1250 | 1700 | 2100 | 2103 |
| Sample 13 | 360 | 570 | 1020 | 1300 | 1720 | 2100 | 2106 |
| Sample 14 | 365 | 623 | 1020 | 1250 | 1720 | 2093 | 2150 |
| Sample 15 | 300 | 500 | 760 | 820 | 1150 | 1480 | 2050 |
| Sample 16 | 140 | 180 | 240 | 320 | 400 | 500 | 1260 |
| Sample 17 | 340 | 550 | 900 | 1080 | 1530 | 2020 | 2100 |
| Sample 18 | 98 | 142 | 202 | 489 | 746 | 993 | 1300 |
| Sample 19 | 350 | 525 | 910 | 1090 | 1550 | 2000 | 2130 |

[Specific Surface Area]

In the sample 11 where the specific surface area of the powder to be obtained is 2.5 $m^2/g$, and in the sample 16 of 3 $m^2/g$, the apparent density of 5 $g/cm^3$ or more cannot be obtained at 920° C. In the sample 15 where the specific surface area is 6 $m^2/g$, the apparent density of 5 $g/cm^3$ or more is obtained.

On the other hand, as the sample 12, if the specific surface area is 15 $m^2/g$, the apparent density of 5 $g/cm^3$ or more is obtained. In the sample 12, the crushing time is long as 93 hours. This may, however, be shortened by increasing the agitating rate.

TABLE 4

Measuring results of density of sintered materials

|  | 870° C. | 880° C. | 910° C. | 920° C. | 940° C. | 1000° C. | 1100° C. |
|---|---|---|---|---|---|---|---|
| Sample 1 | 4.89 | 5.02 | 5.13 | 5.15 | 5.24 | 5.31 | 5.33 |
| Sample 2 | 4.91 | 5.02 | 5.13 | 5.19 | 5.23 | 5.31 | 5.36 |
| Sample 3 | 4.90 | 5.00 | 5.15 | 5.18 | 5.24 | 5.30 | 5.34 |
| Sample 4 | 4.91 | 5.02 | 5.13 | 5.16 | 5.23 | 5.31 | 5.36 |
| Sample 5 | 4.89 | 4.99 | 5.10 | 5.14 | 5.24 | 5.30 | 5.32 |
| Sample 6 | 4.83 | 4.87 | 5.05 | 5.10 | 5.23 | 5.29 | 5.36 |
| Sample 7 | 4.80 | 4.85 | 5.00 | 5.05 | 5.18 | 5.29 | 5.34 |
| Sample 8 | 4.79 | 4.85 | 4.98 | 5.03 | 5.15 | 5.27 | 5.32 |
| Sample 9 | 4.25 | 4.34 | 4.46 | 4.62 | 4.80 | 4.99 | 5.32 |
| Sample 10 | 3.90 | 4.00 | 4.25 | 4.35 | 4.50 | 4.85 | 5.20 |
| Sample 11 | 4.20 | 4.35 | 4.50 | 4.60 | 4.80 | 5.00 | 5.33 |
| Sample 12 | 4.89 | 5.00 | 5.12 | 5.13 | 5.24 | 5.30 | 5.33 |
| Sample 13 | 4.90 | 5.03 | 5.15 | 5.16 | 5.24 | 5.31 | 5.32 |
| Sample 14 | 4.92 | 5.02 | 5.15 | 5.16 | 5.24 | 5.32 | 5.35 |
| Sample 15 | 4.89 | 5.00 | 5.16 | 5.18 | 5.26 | 5.30 | 5.35 |
| Sample 16 | 3.85 | 4.05 | 4.40 | 4.55 | 4.75 | 4.95 | 5.32 |
| Sample 17 | 4.83 | 4.95 | 5.06 | 5.13 | 5.24 | 5.30 | 5.35 |
| Sample 18 | 3.85 | 3.96 | 4.02 | 4.23 | 4.53 | 4.95 | 5.15 |
| Sample 19 | 4.84 | 4.96 | 5.07 | 5.14 | 5.25 | 5.31 | 5.36 |

[Ball Diameter]

As to the samples 3, 14 to 16, the agitating rate and crushing time were made constant, the ball diameter used as medium beads was changed and the wet internal circulation media agitating mill was used for crushing. As seen in the samples 3, 14, and 15, the apparent density 5 $g/cm^3$ or more was obtained with the ball being within 0.2 to 5 mm in diameter by the sintering at 880° C. or higher

[Baking Temperature]

As seen in Table 4, in the samples 1 to 4, and 12 to 15, the apparent density 5 g/cm$^3$ or more may be obtained if the baking temperature is 880° C. or higher. Further, in the case where the baking temperature is 940° C. or lower, which is the melting point of Ag, the simultaneous baking with Ag is possible. Therefore, the baking temperature is 880 to 940° C., and preferably 880 to 920° C.

If the titania balls are used as in the sample 18, in order to obtain the density of the sintered material being 5 g/cm$^3$, the baking temperature 1100° C. or higher is needed.

[Comparison With the Method According to The Japanese Patent No. 2708160]

According to the method of the Japanese Patent No. 2708160, the crushing is carried out, taking a long time as 196 hours in order to suppress the mixing amount of $ZrO_2$ due to the abrasion of the medium beads to approximately 0.02 wt %. According to the invention, the mixing amounts of $ZrO_2$ and $Y_2O_3$ are increased more than 0.06 wt % and 0.003 wt % respectively as in the sample 2 within the area where the apparent density 5 g/cm$^3$ or more may be obtained with baking at the temperature of approximately 920° C. for the purpose of baking simultaneously with Ag, thereby to make it possible to heighten the crushing efficiency by increasing the agitating rate.

EXAMPLE 2

Now, a second example of the preferred embodiments is described hereinafter.

(Weighing and Crushing

The composition of NiO 8.7 mol %, CuO 10.0 mol %, ZnO 32.0 mol %, and $Fe_2O_3$ 49.3 mol % as the main constituent of Ni—Cu—Zn ferrite was wet-mixed with silicon nitride of 3 mm in diameter as medium beads by means of the media agitating mill of the wet internal circulation type, and was dried, followed by temporarily baking at 800° C. Subsequently, the temporarily baked material was pulverized by means of the media agitating mill of the wet internal circulation type by use of silicon nitride as medium beads and with the density of the temporarily based material being 33% as shown in Table 5 in that the agitating rate, crushing time and ball diameter were varied as parameters as shown in the left end column of Table 5.

Namely, as to the samples 20 to 28, the diameter of medium beads was 3 mm, and, the agitating rates were varied as 1 m/s, 2.0 m/s, 4.0 m/s, 4.3 m/s, 5.0 m/s, 6.0 m/s, 7.0 m/s, 8.0 m/s, and 10 m/s such that the average particle diameters of the materials were 0.5 μm, that is, the specific surface area were 8 m$^2$/g, while in connection with the respective agitating rates, the crushing times were varied as 105 hours, 92 hours, 62 hours, 53 hours, 46 hours, 32 hours, 23 hours, 14 hours, and 3 hours. Those were made the samples 20 to 28, in which all the powders with particles of 0.5 μm in average diameter and with specific relative surface area of 8 m$^2$/g were obtained.

As to the samples 29 to 32, the diameter of the ball was 3 mm and the agitating rate was 4 m/s while the crushing times were varied as 1.5 hour, 2.1 hours, 128 hours, and 150 hours, and the powders of average particles being 2.0 μm, 1.5 μm, 0.3 μm, 0.2 μm, and the specific surface areas being 2 m$^2$/g, 2.5 m$^2$/g, 15 m$^2$/g, and 17 m$^2$/g were obtained.

As to the samples 33 to 35, the agitating rate was 4 m/s and the crushing time was 62 hours constant while diameters of the balls were varied as 0.2 mm, 5 mm, and 12 mm, and the powders of average particles being 0.6 μm, 0.7 μm, and 1.4 μm, and relative surface areas being 7 m$^2$/g, 6 m$^2$/g, and 3 m$^2$/g were obtained respectively.

Further, for the purpose of comparison, the tests were carried out as to the conventional samples 36 to 38. The samples 36 to 38 are the same samples as the samples 17 to 19 in the first example, respectively. Therefore, the detailed descriptions are omitted.

Impurities and mixing amount thereof in the materials shown in Table 5 and the quantitative analysis of the main constituents after production shown in Table 6 were measured by the same methods as ones in the first example. The specific surface and the average particle diameter were also measured by the same methods as ones in the first example.

(Production of Test Samples for Measuring Permeability and Density of Sintered Materials 10 wt parts of 3% water solvent of PVA124 was added as a binder to the materials shown in the samples 20 to 38 to make particles. Then, the materials were molded into predetermined shapes under the measuring conditions as later described and were baked for 2 hours in the air at the temperatures 890° C., 900° C., 910° C., 920° C., 940° C., 1000° C., and 1100° C.

TABLE 5

| | | Crushing machine | Ball materials | Ball diameter (mm) | Agitating rate (m/s) | Crushing time (hr) | Average grain diameter (μm) | Specific area (m$^2$/g) | Main impurities and mixing amounts (wt %) | | | | |
|---|---|---|---|---|---|---|---|---|---|---|---|---|---|
| | | | | | | | | | $Fe_3O_2$ | $TiO_2$ | $Al_2O_3$ | Si | $MoO_3$ |
| Crushing rate | Sample 20 | A* | Silicon nitride | 3 | 1.0 | 105 | 0.5 | 8 | — | — | — | 0.010 | — |
| | Sample 21 | A | Silicon nitride | 3 | 2.0 | 92 | 0.5 | 8 | — | — | — | 0.019 | — |
| | Sample 22 | A | Silicon nitride | 3 | 4.0 | 62 | 0.5 | 8 | — | — | — | 0.033 | — |
| | Sample 23 | A | Silicon nitride | 3 | 4.3 | 53 | 0.5 | 8 | — | — | — | 0.037 | — |

TABLE 5-continued

| | | Crushing machine | Ball materials | Ball diameter (mm) | Agitating rate (m/s) | Crushing time (hr) | Average grain diameter (μm) | Specific area (m²/g) | Main impurities and mixing amounts (wt %) | | | | |
|---|---|---|---|---|---|---|---|---|---|---|---|---|---|
| | | | | | | | | | Fe$_3$O$_2$ | TiO$_2$ | Al$_2$O$_3$ | Si | MoO$_3$ |
| | Sample 24 | A | Silicon nitride | 3 | 5.0 | 46 | 0.5 | 8 | — | — | — | 0.042 | — |
| | Sample 25 | A | Silicon nitride | 3 | 6.0 | 32 | 0.5 | 8 | — | — | — | 0.056 | — |
| | Sample 26 | A | Silicon nitride | 3 | 7.0 | 23 | 0.5 | 8 | — | — | — | 0.082 | — |
| | Sample 27 | A | Silicon nitride | 3 | 8.0 | 14 | 0.5 | 8 | — | — | — | 0.112 | — |
| | Sample 28 | A | Silicon nitride | 3 | 10.0 | 3 | 0.5 | 8 | — | — | — | 0.234 | — |
| Crushing Time | Sample 29 | A | Silicon nitride | 3 | 4.0 | 1.5 | 2.0 | 2 | — | — | — | 0.014 | — |
| | Sample 30 | A | Silicon nitride | 3 | 4.0 | 2.1 | 1.5 | 2.5 | — | — | — | 0.015 | — |
| | Sample 31 | A | Silicon nitride | 3 | 4.0 | 128 | 0.3 | 15 | — | — | — | 0.058 | — |
| | Sample 32 | A | Silicon nitride | 3 | 4.0 | 150 | 0.2 | 17 | — | — | — | 0.079 | — |
| Ball diameter | Sample 33 | A | Silicon nitride | 0.2 | 4.0 | 62 | 0.6 | 7 | — | — | — | 0.033 | — |
| | Sample 34 | A | Silicon nitride | 5 | 4.0 | 62 | 0.7 | 6 | — | — | — | 0.042 | — |
| | Sample 35 | A | Silicon nitride | 12 | 4.0 | 62 | 1.4 | 3 | — | — | — | 0.239 | — |
| Conventional example | Sample 36 | A | Stainless steel | 3 | 5.0 | 20 | 0.5 | 8 | 8.12 | — | — | 0.007 | 0.002 |
| | Sample 37 | A | Titania | 3 | 5.0 | 38 | 0.5 | 8 | — | 0.88 | 0.22 | 0.029 | 0.003 |
| | Sample 38 | B* | Stainless steel | 3 | | 192 | 0.3 | 12 | 8.63 | — | — | 0.009 | 0.004 |

*A: Wet internal circulation media agitating mill
B: Ball mill

TABLE 6

| | Weighed quality values and change of composition after production | | | | | | | |
|---|---|---|---|---|---|---|---|---|
| | Weighed quality | | | | Completion | | | |
| | Fe$_2$O$_3$ | ZnO | NiO | CuO | Fe$_2$O$_3$ | ZnO | NiO | CuO |
| Sample 20 | 49.3 | 32.0 | 8.7 | 10.0 | 49.28 | 32.05 | 8.72 | 9.95 |
| Sample 21 | 49.3 | 32.0 | 8.7 | 10.0 | 49.26 | 32.05 | 8.75 | 9.94 |
| Sample 22 | 49.3 | 32.0 | 8.7 | 10.0 | 49.27 | 32.03 | 8.74 | 9.96 |
| Sample 23 | 49.3 | 32.0 | 8.7 | 10.0 | 49.23 | 32.06 | 8.75 | 9.96 |
| Sample 24 | 49.3 | 32.0 | 8.7 | 10.0 | 49.25 | 32.03 | 8.77 | 9.95 |
| Sample 25 | 49.3 | 32.0 | 8.7 | 10.0 | 49.24 | 32.04 | 8.73 | 9.99 |
| Sample 26 | 49.3 | 32.0 | 8.7 | 10.0 | 49.28 | 32.05 | 8.76 | 9.91 |
| Sample 27 | 49.3 | 32.0 | 8.7 | 10.0 | 49.23 | 32.07 | 8.74 | 9.96 |
| Sample 28 | 49.3 | 32.0 | 8.7 | 10.0 | 49.28 | 32.06 | 8.73 | 9.93 |
| Sample 29 | 49.3 | 32.0 | 8.7 | 10.0 | 49.24 | 32.06 | 8.76 | 9.94 |
| Sample 30 | 49.3 | 32.0 | 8.7 | 10.0 | 49.21 | 32.03 | 8.78 | 9.98 |
| Sample 31 | 49.3 | 32.0 | 8.7 | 10.0 | 49.29 | 32.08 | 8.71 | 9.92 |
| Sample 32 | 49.3 | 32.0 | 8.7 | 10.0 | 49.27 | 32.04 | 8.76 | 9.93 |
| Sample 33 | 49.3 | 32.0 | 8.7 | 10.0 | 49.25 | 32.04 | 8.77 | 9.94 |
| Sample 34 | 49.3 | 32.0 | 8.7 | 10.0 | 49.24 | 32.07 | 8.72 | 9.97 |
| Sample 35 | 49.3 | 32.0 | 8.7 | 10.0 | 49.26 | 32.05 | 8.78 | 9.91 |
| Sample 36 | 46.0 | 34.0 | 9.5 | 10.5 | 49.02 | 32.10 | 8.97 | 9.91 |
| Sample 37 | 49.3 | 32.0 | 8.7 | 10.0 | 49.34 | 31.90 | 8.73 | 9.92 |
| Sample 38 | 46.0 | 34.0 | 9.5 | 10.5 | 49.20 | 31.99 | 8.94 | 9.88 |

(Evaluation)

The core materials were evaluated with respect to the crushing time until desired relative surface area were obtained, the confirmation of impurities which might be considered to have been mixed due to abrasion of the medium beads, the divergence in the composition of the main constituents of Fe$_2$O$_3$, ZnO, CuO, and NiO, the initial permeability shown in Table 7, and the apparent densities shown in Table 8. The initial permeability was measured by the same method as in the first example.

With respect to the apparent density, the same calculation method was employed, and the apparent density was used for evaluating the sintered condition of the sintered material as in the first example.

(Results of Evaluation)

[Mix of Impurities]

In the case where a desired specific surface area is 8 m²/g as in samples 20 to 28 in Table 5, the crushing time is shortened as the agitating rate increases. It is, therefore, understood that the agitating rate is increased to heighten the crushing efficiency. However, the increasing of the agitating rate increases the abrasion amount of the medium beads. As to silicon nitride, the main constituents Si are mixed into the material, but mixture of other constituents is not recognized.

On the other hand, as to the samples 36 and 37 of the conventional examples, when comparing with the sample 24 of the same ball diameter and agitating rate with respect to the pulverizing time and the abrasion amount of the balls, in the case of the sample 36, namely in the case of the stainless steel, the crushing time is shortened more than the case of silicon nitride and the crushing efficiency is very high, but the abrasion quantity is very much as about 193 times of silicon nitride. The sample 37, namely the case of titania, the abrasion amount is 16.6 times of silicon nitride.

[Divergence in the Composition Due to Mixed Impurities]

Table 6 shows the divergences of the composition of the material from weighing $Fe_2O_3$, ZnO, CuO, and NiO as the main constituents, the materials having been mixed, crushed, temporarily baked and pulverized. These are the results of the quantitative analysis of the respective oxides. As is seen in Table 6, in the case where the stainless steel is used for medium beads as the samples 36 and 38, the divergence of $Fe_2O_3$ is remarkable from weighing to completion, and in Ni—Cu—Zn ferrite, the composition of $Fe_2O_3$ which requires a most serious control, increases by 3 mol % or higher from the weighing to the completion. Further since the stainless steel is different in hardness as to the outer part and inner part, the medium beads used for a long time will cause a difference in the mixed amount of $Fe_2O_3$. This indicates the difficulty of the composition control.

[Relation Between Crushing Time and Relative Surface Area]

Further as is understood from the samples 29 to 32, the specific surface area is increased by prolonging the crushing time.

[Relation Between Diameters of Balls and Relative Surface Area]

Further as shown in the samples 22, 33, 34 and 35 wherein the agitating rate and crushing time are constant, in the case of the same agitating rate and the same pulverizing time, the surface area of the powder where the ball diameter is 3 mm is largest and the crushing efficiency is high. If a ball mill is used as in the sample 38, the specific surface area is able to be 12 m²/g with the crushing for a long time as 192 hours. However, this requires a crushing time about 1.5 times of the sample 31 where the wet internal circulation media agitating mill is operated at the agitating rate 4 m/s. Moreover, in the case of the sample 38, it can be seen that the specific surface area is small and the crushing efficiency of the ball mill is low.

[Initial Permeability and Apparent Density]

It can be seen that the permeability shown in Table 7 is in relation to the apparent densities shown in Table 8. Namely, in the samples 28 to 30, 35, and 37 where the permeability is relatively low, the apparent density is also low. In the samples 20 to 28, silicon nitride ball of 3 mm in diameter was used as the medium beads and the wet internal circulation media agitating mill was operated to vary the agitating rate for obtaining the specific surface area 8 m²/g, but both of the permeability and the density of the sintered material were deteriorated when the agitating rate was heightened. This is because the increase of mixing amount of Si by abrasion of silicon nitride contributes to the deterioration of the material property. However, in the case where the baking temperature is 1100° C., the difference is small and almost equivalent. However, in the case where the baking temperature is 940° C. or lower, the difference will increase.

Further, it is seen that, comparing with the sample 38 which is under the conventional conditions, this property is deteriorated in the case where the agitating rate exceeds 6 m/s and the mixing amount of Si exceeds 0.056 wt %. An extremely excellent property may be obtained compared with the conventional one so long as these areas are not exceeded. Further, the material may be baked at the temperature 920° C., that is, lower than the melting point of Ag. However, even if the agitating rate exceeds 6 m/s, so long as the mixing quantity of Si did not exceed 0.112 wt %, the apparent density of 5 g/cm³ or more was obtained at the baking temperature 920° C. as shown in the sample 27.

TABLE 7

Measuring results of initial permeability

|  | 890° C. | 900° C. | 910° C. | 920° C. | 940° C. | 1000° C. | 1100° C. |
| --- | --- | --- | --- | --- | --- | --- | --- |
| Sample 20 | 450 | 746 | 875 | 1090 | 1410 | 1990 | 2130 |
| Sample 21 | 456 | 755 | 885 | 1090 | 1430 | 2000 | 2140 |
| Sample 22 | 452 | 749 | 878 | 1060 | 1410 | 2010 | 2140 |
| Sample 23 | 437 | 724 | 849 | 1040 | 1370 | 1960 | 2120 |
| Sample 24 | 414 | 686 | 805 | 962 | 1300 | 1940 | 2080 |
| Sample 25 | 392 | 649 | 761 | 831 | 1170 | 1810 | 2060 |
| Sample 26 | 320 | 534 | 626 | 747 | 1020 | 1530 | 2020 |
| Sample 27 | 294 | 479 | 562 | 682 | 893 | 1370 | 1990 |
| Sample 28 | 153 | 270 | 316 | 374 | 451 | 662 | 1180 |
| Sample 29 | 115 | 198 | 223 | 305 | 378 | 477 | 1150 |
| Sample 30 | 163 | 271 | 320 | 377 | 495 | 688 | 1120 |
| Sample 31 | 460 | 760 | 892 | 1080 | 1420 | 2010 | 2110 |
| Sample 32 | 469 | 776 | 910 | 1110 | 1460 | 2030 | 2090 |
| Sample 33 | 466 | 772 | 906 | 1090 | 1420 | 2000 | 2070 |
| Sample 34 | 348 | 574 | 673 | 903 | 1150 | 1810 | 1980 |
| Sample 35 | 171 | 260 | 305 | 409 | 567 | 887 | 1190 |
| Sample 36 | 653 | 780 | 900 | 1080 | 1530 | 2020 | 2100 |
| Sample 37 | 160 | 181 | 202 | 489 | 746 | 993 | 1300 |
| Sample 38 | 667 | 785 | 910 | 1090 | 1550 | 2000 | 2130 |

TABLE 8

Measuring results of density of sintered materials

|  | 890° C. | 900° C. | 910° C. | 920° C. | 940° C. | 1000° C. | 1100° C. |
| --- | --- | --- | --- | --- | --- | --- | --- |
| Sample 20 | 4.75 | 4.88 | 5.10 | 5.14 | 5.25 | 5.30 | 5.33 |
| Sample 21 | 4.77 | 4.90 | 5.09 | 5.14 | 5.23 | 5.30 | 5.32 |
| Sample 22 | 4.74 | 4.89 | 5.09 | 5.14 | 5.24 | 5.28 | 5.34 |
| Sample 23 | 4.75 | 4.87 | 5.08 | 5.13 | 5.23 | 5.28 | 5.31 |
| Sample 24 | 4.73 | 4.84 | 5.07 | 5.12 | 5.24 | 5.28 | 5.32 |
| Sample 25 | 4.65 | 4.77 | 5.03 | 5.09 | 5.22 | 5.29 | 5.30 |
| Sample 26 | 4.64 | 4.75 | 5.00 | 5.04 | 5.21 | 5.27 | 5.31 |
| Sample 27 | 4.63 | 4.76 | 4.96 | 5.01 | 5.14 | 5.28 | 5.30 |
| Sample 28 | 4.00 | 4.11 | 4.42 | 4.60 | 4.78 | 4.98 | 5.30 |
| Sample 29 | 3.65 | 3.84 | 4.20 | 4.30 | 4.47 | 4.84 | 5.21 |
| Sample 30 | 3.67 | 3.86 | 4.44 | 4.55 | 4.58 | 4.99 | 5.20 |

TABLE 8-continued

Measuring results of density of sintered materials

|  | 890° C. | 900° C. | 910° C. | 920° C. | 940° C. | 1000° C. | 1100° C. |
|---|---|---|---|---|---|---|---|
| Sample 31 | 4.74 | 4.88 | 5.09 | 5.13 | 5.24 | 5.28 | 5.35 |
| Sample 32 | 4.73 | 4.88 | 5.09 | 5.14 | 5.23 | 5.28 | 5.34 |
| Sample 33 | 4.77 | 4.90 | 5.10 | 5.15 | 5.24 | 5.30 | 5.32 |
| Sample 34 | 4.70 | 4.85 | 5.04 | 5.12 | 5.20 | 5.28 | 5.33 |
| Sample 35 | 3.66 | 3.82 | 4.37 | 4.50 | 4.72 | 4.93 | 5.30 |
| Sample 36 | 4.98 | 5.03 | 5.06 | 5.13 | 5.24 | 5.30 | 5.35 |
| Sample 37 | 3.97 | 3.99 | 4.02 | 4.23 | 4.53 | 4.95 | 5.15 |
| Sample 38 | 4.99 | 5.03 | 5.07 | 5.14 | 5.25 | 5.31 | 5.36 |

[Agitating Rate]

Samples where the apparent density 5.0 g/cm$^3$ or more is secured by sintering at 920° C. or lower which is suited to the simultaneous baking with Ag, are the samples 20 to 27, 31 to 34, 36 and 38. In the case of the sample 28, the agitating rate is 10 m/s, and in this case, even if the average particle diameter and relative surface area are the same as the samples 1 to 8, because the mixing amount of Si is too much, the apparent density 5.0 g/cm$^3$ or more cannot be obtained in spite of being at 940° C. Further, in the case of the sample 20, the agitating rate is 1 m/s and since it takes 105 hours until the specific surface are a comes to 8.0 m$^2$/g, this is not desirable. Therefore, a preferred agitating rate is 2.0 to 8.0 m/s.

[Specific Surface Area]

In the sample 30 where the specific surface area of the powder to be obtained is 2.5 m$^2$/g, and in the sample 35 of 3 m$^2$/g, the apparent density of 5 g/cm$^3$ or more cannot be obtained at 920° C. In the sample 34 where the specific surface area is 6 m$^2$/g, the apparent density of 5 g/cm$^3$ or more is obtained.

On the other hand, as the sample 31, if the specific surface area is 15 m$^2$/g, the apparent density of 5 g/cm$^3$ or more is obtained. In the sample 12, the crushing time is long as 93 hours. This may, however, be shortened by increasing the agitating rate.

[Ball Diameter]

As to the samples 22, 33 to 35, the agitating rate and crushing time were made constant, the ball diameter used as medium beads was changed and the wet internal circulation media agitating mill was used for crushing. As seen in the samples 22, 33, and 34, the apparent density 5 g/cm$^3$ or more was obtained with the ball being within 0.2 to 5 mm in diameter by the sintering at 910° C. or higher

[Baking Temperature]

As seen in Table 8, the apparent density 5 g/cm$^3$ or more may be obtained if the baking temperature is 910° C. or higher. Further, in the case where the baking temperature is 940° C. or lower, which is lower than 960° C. of the melting point of Ag, the simultaneous baking with Ag is possible. Therefore, the baking temperature is 910 to 940° C., and preferably 910 to 920° C.

If the titania balls are used as in the sample 37, in order to obtain the density of the sintered material being 5 g/cm$^3$, the baking temperature 1100° C. or higher is needed.

[Comparison With the Method According to the Japanese Patent No. 2708160]

According to the method of the Japanese Patent No. 2708160, the crushing is carried out, taking a long time as 196 hours in order to suppress the mixing amount of ZrO$_2$ due to the abrasion of the medium beads to approximately 0.02 wt %. According to the invention, by means of the media agitating mill of the wet internal circulation type and by using silicon nitride as medium beads, the mixing amounts of abrasion powder are increased more than 0.010 wt % respectively as in the sample 21 within the area where the apparent density 5 g/cm$^3$ or more may be obtained with baking at the temperature of approximately 920° C. for the purpose of baking simultaneously with Ag, thereby to make it possible to heighten the crushing efficiency by increasing the agitating rate.

EXAMPLE 3

Now, a third example of the preferred embodiments is described hereinafter.

(Weighing and Crushing)

The composition of NiO 8.7 mol %, CuO 10.0 mol %, ZnO 32.0 mol %, and Fe$_2$O$_3$ 49.3 mol % as the main constituent of Ni—Cu—Zn ferrite was wet-mixed with partially stabilized zirconia (PSZ) and silicon nitride of 3 mm in diameter as medium beads by means of the media agitating mill of the wet internal circulation type, and was dried, followed by temporarily baking at 800° C. Subsequently, the temporarily baked material was pulverized by means of the media agitating mill of the wet internal circulation type by use of partially stabilized zirconia (PSZ) and silicon nitride as medium beads and with the density of the temporarily based material being 33% as shown in Table 9 in that the agitating rate, crushing time and ball diameter were varied as parameters as shown in the left end column of Table 9.

Namely, as to the samples 39 to 47, the ratio of medium beads was (PSZ):(silicon nitride)=50%: 50% as the volume ratio, and the diameter of medium beads was 3 mm, and, the agitating rates were varied as 1 m/s, 2.0 m/s, 4.0 m/s, 4.3 m/s, 5.0 m/s, 6.0 m/s, 7.0 m/s, 8.0 m/s, and 10 m/s such that the average particle diameters of the materials were 0.5 μm, that is, the specific surface area were 8 m$^2$/g, while in connection with the respective agitating rates, the crushing times were varied as 93 hours, 82 hours, 55 hours, 45 hours, 40 hours, 28 hours, 20 hours, 12 hours, and 2.5 hours. Those were made the samples 39 to 47, in which all the powders with particles of 0.5 μm in average diameter and with specific relative surface area of 8 m$^2$/g were obtained.

As to the samples 48 to 51, the diameter of the ball was 3 mm and the agitating rate was 4 m/s while the crushing times were varied as 1 hour, 1.5 hours, 115 hours, and 134 hours, and the powders of average particles being 2.0 μm, 1.5 μm, 0.3 μm, 0.2 μm, and the specific surface areas being 2 m$^2$/g, 2.5 m$^2$/g, 15 m$^2$/g, and 17 m$^2$/g were obtained.

As to the samples 52 to 54, the agitating rate was 4 m/s and the crushing time was 55 hours constant while diameters of the balls were varied as 0.2 mm, 5 mm, and 12 mm, and the powders of average particles being 0.6 μm, 0.7 μm, and 1.5 μm, and relative surface areas being 7 m$^2$/g, 6 m$^2$/g, and 3 m$^2$/g were obtained respectively.

As to the samples 55 to 57, the agitating rate of 4 m/s, and the crushing times of 55 hour, and the ball diameter of 3 mm were made constant. The ratio of PSZ and silicon nitride, which are used as medium beads, was varied as (PSZ): (Silicon nitride)=20:80, (PSZ):(Silicon nitride)=80:20, and (PSZ):(Silicon nitride)=99:1, respectively in volume ratio. The powders of average particles of 0.7 μm, 0.45 μm, and 0.45 μm, and the specific surface areas of 6 m²/g, 9 m²/g, 9 m²/g were respectively obtained.

Further, for the purpose of comparison, the tests were carried out as to the conventional samples 58 to 60. The samples 58 to 60 are the same samples as the samples 17 to 19 in the first example, respectively. Therefore, the detailed descriptions are omitted.

Impurities and mixing amount thereof in the materials shown in Table 10 and the quantitative analysis of the main constituents after production shown in Table 11 were measured by the same methods as ones in the first example. The specific surface and the average particle diameter were also measured by the same methods as ones in the first example.

(Production of Test Samples for Measuring Permeability and Density of Sintered Materials)

10 wt parts of 3% water solvent of PVA124 was added as a binder to the materials shown in the samples 39 to 60 to make particles. Then, the materials were molded into predetermined shapes under the measuring conditions as later described and were baked for 2 hours in the air at the temperatures 870° C., 880° C., 910° C., 920° C., 940° C., 1100° C., and 1100° C.

(Evaluation)

The core materials were evaluated with respect to the crushing time until desired relative surface area were obtained, the confirmation of impurities which might be considered to have been mixed due to abrasion of the medium beads, the divergence in the composition of the main constituents of $Fe_2O_3$, ZnO, CuO, and NiO, the initial permeability shown in Table 12, and the apparent densities shown in Table 13. The initial permeability was measured by the same method as in the first example.

With respect to the apparent density, the same calculation method was employed, and the apparent density was used for evaluating the sintered condition of the sintered material as in the first example.

TABLE 9

| | | Crushing machine | Ball materials | Ball diameter (mm) | Agitating rate (m/s) | Crushing time (hr) | Average grain diameter (μm) | Specific area (m²/g) |
|---|---|---|---|---|---|---|---|---|
| Crushing rate | Sample 39 | A* | PSZ:Silicon nitride = 50:50 | 3 | 1 | 93 | 0.5 | 8 |
| | Sample 40 | A | PSZ:Silicon nitride = 50:50 | 3 | 2 | 82 | 0.5 | 8 |
| | Sample 41 | A | PSZ:Silicon nitride = 50:50 | 3 | 4 | 55 | 0.5 | 8 |
| | Sample 42 | A | PSZ:Silicon nitride = 50:50 | 3 | 4.3 | 45 | 0.5 | 8 |
| | Sample 43 | A | PSZ:Silicon nitride = 50:50 | 3 | 5 | 40 | 0.5 | 8 |
| | Sample 44 | A | PSZ:Silicon nitride = 50:50 | 3 | 6 | 28 | 0.5 | 8 |
| | Sample 45 | A | PSZ:Silicon nitride = 50:50 | 3 | 7 | 20 | 0.5 | 8 |
| | Sample 46 | A | PSZ:Silicon nitride = 50:50 | 3 | 8 | 12 | 0.5 | 8 |
| | Sample 47 | A | PSZ:Silicon nitride = 50:50 | 3 | 10 | 2.5 | 0.5 | 8 |
| Crushing Time | Sample 48 | A | PSZ:Silicon nitride = 50:50 | 3 | 4 | 1 | 2.2 | 1.8 |
| | Sample 49 | A | PSZ:Silicon nitride = 50:50 | 3 | 4 | 1.5 | 1.8 | 2.2 |
| | Sample 50 | A | PSZ:Silicon nitride = 50:50 | 3 | 4 | 115 | 0.3 | 15 |
| | Sample 51 | A | PSZ:Silicon nitride = 50:50 | 3 | 4 | 134 | 0.2 | 17 |
| Ball diameter | Sample 52 | A | PSZ:Silicon nitride = 50:50 | 0.2 | 4 | 55 | 0.6 | 7 |
| | Sample 53 | A | PSZ:Silicon nitride = 50:50 | 5 | 4 | 55 | 0.7 | 6 |
| | Sample 54 | A | PSZ:Silicon nitride = 50:50 | 12 | 4 | 55 | 1.5 | 3 |
| Ratio | Sample 55 | A | PSZ:Silicon nitride = 20:80 | 3 | 4 | 55 | 0.7 | 6 |
| | Sample 56 | A | PSZ:Silicon nitride = 80:20 | 3 | 4 | 55 | 0.45 | 9 |
| | Sample 57 | A | PSZ:Silicon nitride = 99:1 | 3 | 4 | 55 | 0.45 | 9 |
| Conventional example | Sample 58 | A | Stainless steel | 3 | 5 | 20 | 0.5 | 8 |
| | Sample 59 | A | Titania | 3 | 5 | 38 | 0.5 | 8 |
| | Sample 60 | B* | Stainless steel | 3 | | 192 | 0.3 | 12 |

*A: Wet internal circulation media agitating mill
B: Ball mill

TABLE 10

| | | Main impurities and mixing amounts (wt %) | | | | | | |
|---|---|---|---|---|---|---|---|---|
| | | $ZrO_2$ | $Y_2O_3$ | $Fe_2O_3$ | $TiO_2$ | $Al_2O_3$ | Si | $MoO_3$ |
| Crushing rate | Sample 39 | 0.005 | 0.001 | — | — | — | 0.006 | — |
| | Sample 40 | 0.031 | 0.001 | — | — | — | 0.010 | — |
| | Sample 41 | 0.062 | 0.004 | — | — | — | 0.015 | — |
| | Sample 42 | 0.071 | 0.004 | — | — | — | 0.018 | — |
| | Sample 43 | 0.092 | 0.005 | — | — | — | 0.021 | — |
| | Sample 44 | 0.111 | 0.006 | — | — | — | 0.027 | — |
| | Sample 45 | 0.153 | 0.008 | — | — | — | 0.041 | — |
| | Sample 46 | 0.194 | 0.011 | — | — | — | 0.056 | — |
| | Sample 47 | 0.302 | 0.015 | — | — | — | 0.112 | — |
| Crushing Time | Sample 48 | 0.010 | 0.001 | — | — | — | 0.007 | — |
| | Sample 49 | 0.012 | 0.001 | — | — | — | 0.007 | — |
| | Sample 50 | 0.120 | 0.006 | — | — | — | 0.028 | — |
| | Sample 51 | 0.140 | 0.009 | — | — | — | 0.039 | — |
| Ball diameter | Sample 52 | 0.05 | 0.003 | — | — | — | 0.014 | — |
| | Sample 53 | 0.09 | 0.005 | — | — | — | 0.020 | — |
| | Sample 54 | 0.32 | 0.017 | — | — | — | 0.117 | — |

TABLE 10-continued

| | | Main impurities and mixing amounts (wt %) | | | | | | |
|---|---|---|---|---|---|---|---|---|
| | | $ZrO_2$ | $Y_2O_3$ | $Fe_2O_3$ | $TiO_2$ | $Al_2O_3$ | Si | $MoO_3$ |
| Ratio | Sample 55 | 0.03 | 0.001 | — | — | — | 0.038 | — |
| | Sample 56 | 0.10 | 0.006 | — | — | — | 0.001 | — |
| | Sample 57 | 0.12 | 0.007 | — | — | — | 0.001 | — |
| Conventional example | Sample 58 | — | — | 8.12 | — | — | 0.007 | 0.002 |
| | Sample 59 | — | — | — | 0.88 | 0.22 | 0.029 | 0.003 |
| | Sample 60 | | | 8.63 | — | — | 0.009 | 0.004 |

(Results of Evaluation)

[Mix of Impurities]

In the case where a desired specific surface area is 8 $m^2/g$ as in samples 39 to 47 in Table 9, the crushing time is shortened as the agitating rate increases. It is, therefore, understood that the agitating rate is increased to heighten the crushing efficiency. However, the increasing of the agitating rate increases the abrasion amount of the medium beads. As shown in FIG. 10, as to PSZ and silicon nitride, the main constituents $ZrO_2$, $Y_2O_3$, and Si are mixed into the material, but mixture of other constituents is not recognized.

On the other hand, as to samples 58 and 59 of the conventional examples, when comaparing with the sample 43 of the same ball diameter and agitating rate with respect to the pulverizing time and the abrasion amount of the balls, in the case of the sample 58, namely in the case of the stainless steel, the crushing time is shortened more than the case of (PSZ): (Silicon nitride) =50:50 and the crushing efficiency is very high, but the abrasion quantity is very much as about 73 times of (PSZ):(Silicon nitride)=50:50. The sample 59, namely the case of titania, the abrasion amount is about 8.2 times of (PSZ):(Silicon nitride)=50:50.

[Divergence in the Composition Due to Mixed Impurities]

Table 11 shows the divergences of the composition of the material from weighing $Fe_2O_3$, ZnO, CuO, and NiO as the main constituents, the materials having been mixed, crushed, temporarily baked and pulverized. These are the results of the quantitative analysis of the respective oxides. As is seen in Table 11, in the case where the stainless steel is used for medium beads as the samples 58 and 60, the divergence of $Fe_2O_3$ is remarkable from weighing to completion, and in Ni—Cu—Zn ferrite, the composition of $Fe_2O_3$ which requires a most serious control, increases by 3 mol % or higher from the weighing to the completion. Further since the stainless steel is different in hardness as to the outer part and inner part, the medium beads used for a long time will cause a difference in the mixed amount of $Fe_2O_3$. This indicates the difficulty of the composition control.

[Relation Between Crushing Time and Relative Surface Area]

Further as is understood from the samples 48 to 51, the specific surface area is increased by prolonging the crushing time.

TABLE 11

Weighed quality values and change of composition after production

| | Weighed quality | | | | Completion | | | |
|---|---|---|---|---|---|---|---|---|
| | $Fe_2O_3$ | ZnO | NiO | CuO | $Fe_2O_3$ | ZnO | NiO | CuO |
| Sample 39 | 49.3 | 32.0 | 8.7 | 10.0 | 49.20 | 32.05 | 8.77 | 9.98 |
| Sample 40 | 49.3 | 32.0 | 8.7 | 10.0 | 49.21 | 32.03 | 8.84 | 9.92 |
| Sample 41 | 49.3 | 32.0 | 8.7 | 10.0 | 49.20 | 32.05 | 8.83 | 9.92 |
| Sample 42 | 49.3 | 32.0 | 8.7 | 10.0 | 49.21 | 32.03 | 8.81 | 9.95 |
| Sample 43 | 49.3 | 32.0 | 8.7 | 10.0 | 49.25 | 32.08 | 8.71 | 9.96 |
| Sample 44 | 49.3 | 32.0 | 8.7 | 10.0 | 49.22 | 32.06 | 8.80 | 9.92 |
| Sample 45 | 49.3 | 32.0 | 8.7 | 10.0 | 49.23 | 32.05 | 8.74 | 9.98 |
| Sample 46 | 49.3 | 32.0 | 8.7 | 10.0 | 49.25 | 32.04 | 8.75 | 9.96 |
| Sample 47 | 49.3 | 32.0 | 8.7 | 10.0 | 49.25 | 32.03 | 8.77 | 9.95 |
| Sample 48 | 49.3 | 32.0 | 8.7 | 10.0 | 49.26 | 32.06 | 8.72 | 9.96 |
| Sample 49 | 49.3 | 32.0 | 8.7 | 10.0 | 49.23 | 32.05 | 8.80 | 9.92 |
| Sample 50 | 49.3 | 32.0 | 8.7 | 10.0 | 49.25 | 32.00 | 8.82 | 9.93 |
| Sample 51 | 49.3 | 32.0 | 8.7 | 10.0 | 49.22 | 32.02 | 8.82 | 9.94 |
| Sample 52 | 49.3 | 32.0 | 8.7 | 10.0 | 49.25 | 32.05 | 8.72 | 9.98 |
| Sample 53 | 49.3 | 32.0 | 8.7 | 10.0 | 49.22 | 32.02 | 8.77 | 9.99 |
| Sample 54 | 49.3 | 32.0 | 8.7 | 10.0 | 49.26 | 32.01 | 8.81 | 9.92 |
| Sample 55 | 49.3 | 32.0 | 8.7 | 10.5 | 49.25 | 32.05 | 8.72 | 9.98 |
| Sample 56 | 49.3 | 32.0 | 8.7 | 10.0 | 49.25 | 32.06 | 8.73 | 9.96 |
| Sample 57 | 49.3 | 32.0 | 8.7 | 10.0 | 49.25 | 32.04 | 8.73 | 9.98 |
| Sample 58 | 46.0 | 34.0 | 9.5 | 10.0 | 49.02 | 32.10 | 8.97 | 9.91 |
| Sample 59 | 49.3 | 32.0 | 8.7 | 10.0 | 49.34 | 31.90 | 8.73 | 9.92 |
| Sample 60 | 46.0 | 34.0 | 9.5 | 10.5 | 49.20 | 31.99 | 8.94 | 9.88 |

[Relation Between Diameters of Balls and Relative Surface Area]

Further as shown in the samples 41, 52, 53 and 54 wherein the agitating rate and crushing time are constant, in the case of the same agitating rate and the same pulverizing time, the surface area of the powder where the ball diameter is 3 mm is largest and the crushing efficiency is high. If a ball mill is used as in the sample 60, the specific surface area is able to be 12 $m^2/g$ with the crushing for a long time as 192 hours. However, this requires a crushing time more than twice of the sample 50 where the wet internal circulation media agitating mill is operated at the agitating rate 4 m/s. Moreover, in the case of the sample 60, it can be seen that the specific surface area is small and the crushing efficiency of the ball mill is low.

[Initial Permeability and Apparent Density]

It can be seen that the permeability shown in Table 12 is in relation to the apparent densities shown in Table 13. Namely, in the samples 47 to 49, 54, and 59 where the permeability is relatively low, the apparent density is also low. In the samples 39 to 47, PSZ and silicon nitride balls of 3 mm in diameter were used as the medium beads and the wet internal circulation media agitating mill was operated to vary the agitating rate for obtaining the specific surface area 8 m²/g, but both of the permeability and the density of the sintered material were deteriorated when the agitating rate was heightened. This is because the increase of mixing amount of $ZrO_2$ and $Y_2O_3$ which are constituents of PSZ and mixing amount of Si by the silicon nitride contributes to the deterioration of the material property. However, in the case where the baking temperature is 1100° C., the difference is small and almost equivalent. However, in the case where the baking temperature is 940° C. or lower, the difference will increase.

Further, it is seen that, comparing with the sample 60 which is under the conventional conditions, this property is deteriorated in the case where the agitating rate exceeds 6 m/s, the mixing amount of $ZrO_2$ exceeds 0.111 wt %, $Y_2O_3$ exceeds 0.006 wt %, and Si exceeds 0.027 wt %. An extremely excellent property may be obtained compared with the conventional one so long as these areas are not exceeded. Further, the material may be baked at the temperature 920° C., that is, lower than the melting point of Ag. However, even if exceeding the value and so long as the mixing quantity of $ZrO_2$ did not exceed 0.194 wt %, and the mixing quantity of $Y_2O_3$ does not exceed 0.011 wt %, and the mixing quantity of Si does not exceed 0.056 wt %, the apparent density of 5 g/cm³ or more was obtained at the baking temperature 920° C. as shown in the sample 46.

[Agitating Rate]

Samples where the apparent density 5.0 g/cm³ or more is secured by sintering at 920° C. or lower which is suited to the simultaneous baking with Ag, are the samples 39 to 46, 50 to 53, 55 to 57, 58 and 60. In the case of the sample 47, the agitating rate is 10 m/s, and in this case, even if the average particle diameter and relative surface area are the same as the samples 39 to 46, because the mixing amount of $ZrO_2$, $Y_2O_3$, and Si is too much, the apparent density 5.0 g/cm³ or more cannot be obtained in spite of being at 940° C. Further, in the case of the sample 39, the agitating rate is 1 m/s and since it takes 93 hours until the specific surface area comes to 8.0 m²/g, this is not desirable. Therefore, a preferred agitating rate is 2.0 to 8.0 m/s.

TABLE 12

Measuring results of initial permeability

|  | 870° C. | 880° C. | 910° C. | 920° C. | 940° C. | 1000° C. | 1100° C. |
|---|---|---|---|---|---|---|---|
| Sample 39 | 330 | 520 | 931 | 1200 | 1680 | 2056 | 2092 |
| Sample 40 | 345 | 523 | 963 | 1210 | 1683 | 2082 | 2102 |
| Sample 41 | 340 | 519 | 932 | 1206 | 1679 | 2085 | 2105 |
| Sample 42 | 329 | 480 | 925 | 1165 | 1615 | 1980 | 2102 |
| Sample 43 | 326 | 476 | 893 | 1098 | 1515 | 1907 | 2052 |
| Sample 44 | 303 | 454 | 823 | 939 | 1325 | 1825 | 2036 |
| Sample 45 | 255 | 383 | 658 | 846 | 1138 | 1605 | 1996 |
| Sample 46 | 180 | 303 | 592 | 753 | 983 | 1435 | 1983 |
| Sample 47 | 126 | 203 | 293 | 386 | 496 | 653 | 1246 |
| Sample 48 | 108 | 186 | 232 | 336 | 403 | 485 | 1180 |
| Sample 49 | 153 | 207 | 302 | 393 | 515 | 692 | 1253 |
| Sample 50 | 342 | 527 | 971 | 1220 | 1695 | 2092 | 2106 |
| Sample 51 | 346 | 516 | 968 | 1232 | 1701 | 2100 | 2102 |
| Sample 52 | 347 | 529 | 982 | 1231 | 1698 | 2096 | 2136 |
| Sample 53 | 372 | 405 | 672 | 903 | 1230 | 1632 | 2115 |
| Sample 54 | 122 | 192 | 228 | 343 | 410 | 495 | 1243 |
| Sample 55 | 322 | 463 | 863 | 1068 | 1493 | 1876 | 2023 |
| Sample 56 | 352 | 583 | 974 | 1223 | 1685 | 2092 | 2110 |

TABLE 12-continued

Measuring results of initial permeability

|  | 870° C. | 880° C. | 910° C. | 920° C. | 940° C. | 1000° C. | 1100° C. |
|---|---|---|---|---|---|---|---|
| Sample 57 | 358 | 590 | 980 | 1232 | 1692 | 2098 | 2125 |
| Sample 58 | 340 | 550 | 900 | 1080 | 1530 | 2020 | 2100 |
| Sample 59 | 98 | 142 | 202 | 489 | 746 | 993 | 1300 |
| Sample 60 | 350 | 525 | 910 | 1090 | 1550 | 2000 | 2130 |

[Specific Surface Area]

In the sample 49 where the specific surface area of the powder to be obtained is 2.5 m²/g, and in the sample 54 of 3 m²/g, the apparent density of 5 g/cm³ or more cannot be obtained at 920° C. In the sample 53 where the specific surface area is 6 m²/g, the apparent density of 5.0 g/cm³ or more is obtained.

On the other hand, as the sample 50, if the specific surface area is 15 m²/g, the apparent density of 5.0 g/cm³ or more is obtained. In the sample 50, the crushing time is long as 115 hours. This may, however, be shortened by increasing the agitating rate.

TABLE 13

Measuring results of density of sintered materials

|  | 870° C. | 880° C. | 910° C. | 920° C. | 940° C. | 1000° C. | 1100° C. |
|---|---|---|---|---|---|---|---|
| Sample 39 | 4.65 | 4.90 | 5.02 | 5.12 | 5.24 | 5.31 | 5.33 |
| Sample 40 | 4.67 | 4.90 | 5.02 | 5.13 | 5.23 | 5.30 | 5.34 |
| Sample 41 | 4.65 | 4.88 | 5.02 | 5.12 | 5.24 | 5.30 | 5.35 |
| Sample 42 | 4.67 | 4.91 | 5.02 | 5.10 | 5.22 | 5.30 | 5.36 |
| Sample 43 | 4.65 | 4.88 | 4.98 | 5.08 | 5.24 | 5.29 | 5.32 |
| Sample 44 | 4.60 | 4.75 | 4.88 | 5.05 | 5.22 | 5.29 | 5.36 |
| Sample 45 | 4.55 | 4.73 | 4.85 | 5.02 | 5.20 | 5.28 | 5.34 |
| Sample 46 | 4.54 | 4.70 | 4.84 | 5.00 | 5.15 | 5.27 | 5.32 |
| Sample 47 | 4.15 | 4.25 | 4.35 | 4.52 | 4.70 | 5.00 | 5.32 |
| Sample 48 | 3.88 | 4.00 | 4.22 | 4.36 | 4.50 | 4.82 | 5.15 |
| Sample 49 | 4.10 | 4.20 | 4.30 | 4.55 | 4.68 | 4.99 | 5.30 |
| Sample 50 | 4.67 | 4.93 | 5.00 | 5.10 | 5.22 | 5.30 | 5.32 |
| Sample 51 | 4.68 | 4.92 | 5.00 | 5.09 | 5.24 | 5.30 | 5.32 |
| Sample 52 | 4.68 | 4.93 | 5.03 | 5.10 | 5.25 | 5.31 | 5.35 |
| Sample 53 | 4.65 | 4.89 | 5.06 | 5.12 | 5.25 | 5.30 | 5.33 |
| Sample 54 | 3.80 | 4.02 | 4.20 | 4.30 | 4.48 | 4.80 | 5.10 |
| Sample 55 | 4.63 | 4.83 | 5.00 | 5.07 | 5.22 | 5.25 | 5.32 |
| Sample 56 | 4.82 | 4.96 | 5.10 | 5.17 | 5.24 | 5.32 | 5.35 |
| Sample 57 | 4.90 | 5.00 | 5.15 | 5.18 | 5.24 | 5.33 | 5.36 |
| Sample 58 | 4.83 | 4.95 | 5.06 | 5.13 | 5.24 | 5.30 | 5.35 |
| Sample 59 | 3.85 | 3.96 | 4.02 | 4.23 | 4.53 | 4.95 | 5.15 |
| Sample 60 | 4.84 | 4.96 | 5.07 | 5.14 | 5.25 | 5.31 | 5.36 |

[Ball Diameter]

As to the samples 41, 52 to 53, the agitating rate and crushing time were made constant, the ball diameter used as medium beads was changed and the wet internal circulation media agitating mill was used for crushing. As seen in the samples 41, 55, and 57, the apparent density 5 g/cm³ or more was obtained with the ball being within 0.2 to 5 mm in diameter by the sintering at 920° C. or higher.

[Ratio of PSZ Beads and Silicon Nitride Beads]

As to the samples 41, 55 to 57, the ball diameter, agitating rate, and crushing time were made constant, and The volume ratio of PSZ and silicon nitride, which are used as medium beads, was changed with using the wet internal circulation media agitating mill for crushing. As seen in the samples, the apparent density 5 g/cm³ or more was obtained by the sintering at 920° C. or higher in the range between (PSZ): (Silicon nitride)=20:80 and 99:1.

[Baking Temperature]

In the case where the baking temperature is 940° C. or lower, which is lower than 960° C. of the melting point of Ag, the simultaneous baking with Ag is possible. Therefore, the baking temperature is 880 to 940° C., and preferably 910 to 920° C.

If the titania balls are used as in the sample 59, in order to obtain the density of the sintered material being 5 g/cm$^3$, the baking temperature 1100° C. or higher is needed.

[Comparison With the Method According to the Japanese Patent No. 2708160]

According to the method of the Japanese Patent No. 2708160, the crushing is carried out, taking a long time as 196 hours in order to suppress the mixing amount of $ZrO_2$ due to the abrasion of the medium beads to approximately 0.02 wt %. According to the invention, the mixing amounts of $ZrO_2$ and $Y_2O_3$ are increased more than 0.03 wt % and 0.001 wt % respectively as in the sample 45, and the mixing amount of Si is further increased more than 0.001 wt % with using silicon nitride beads at the same time as in the sample 56 within the area where the apparent density 5 g/cm$^3$ or more may be obtained with baking at the temperature of approximately 920° C. for the purpose of baking simultaneously with Ag, thereby to make it possible to heighten the crushing efficiency by increasing the agitating rate.

According to the oxide magnetic material according to the present invention, PSZ is used to contain the above-mentioned amounts of $Y_2O_3$ and $ZrO_2$ in Ni—Cu—Zn, thereby to make it possible to bake the material at the temperature for baking simultaneously with Ag and to obtain a sintered material of the apparent density being 5 g/cm$^3$ or more by sintering and of permeability which may satisfy demands. Further with the above-mentioned range of amounts of $Y_2O_3$ and $ZrO_2$ being predetermined, the oxide magnetic material may be obtained in a shortened period of time, and the production cost may be lowered.

Similar effect is accomplished by using silicon nitride instead of PSZ in order to contain the above-mentioned amounts of Si in Ni—Cu—Zn. In this case, with the above-mentioned range of amounts of Si being predetermined, the oxide magnetic material may be obtained in a shortened period of time, and the production cost may be lowered.

Furthermore, similar effect is accomplished by using both PSZ and silicon nitride instead of PSZ in order to contain the above-mentioned amounts of $Y_2O_3$, $ZrO_2$, and Si in Ni—Cu—Zn. In this case, with the above-mentioned range of amounts of $Y_2O_3$, $ZrO_2$, and Si being predetermined, the oxide magnetic material maybe obtained in a shortened period of time, and the production cost may be lowered.

The chip parts according to the second and third aspect of the invention are formed as the bulk-type coil part or the laminated coil part by using the sintered one of the oxide magnetic material according to the first aspect. Therefore, the thus obtained coil parts may cope with the ones as baked at high temperature with respect to strength and permeability.

The chip part according to the fourth aspect of the invention has the internal conductor containing as the main constituent Ag or the alloy of Ag and Pd according to the third aspect. Therefore, such a coil part of high Q may be obtained.

According to the method in the fifth aspect of the invention for producing the oxide magnetic material, the balls of partially stabilized zirconia are used to crush the material after being temporarily baked, thereby to eliminate the difficult problem in the composition control as in the case that the conventional stainless balls are used. Further, since $Y_2O_3$ and $ZrO_2$ are mixed into the material by utilizing the crushing process, the processes for weighing and mixing may be no longer necessary. Further, the agitating rate is increased to shorten the crushing period of time, thereby to lower the production cost in contrast to the case for suppressing the mixing quantity of $ZrO_2$ as described in the Japanese Patent No. 2708160.

Similar effect is accomplished by using silicon nitride balls instead of PSZ balls. In this case, since Si is mixed into the material by utilizing the crushing process, the processes for weighing and mixing may be no longer necessary.

Furthermore, similar effect is accomplished by using both PSZ balls and silicon nitride balls. In this case, since, $Y_2O_3$ and $ZrO_2$ and Si is mixed into the material by utilizing the crushing process, the processes for weighing and mixing may be no longer necessary.

According to the methods as in the sixth or eighth aspect of the invention for producing the oxide magnetic material, since diameter of the medium beads, agitating rate of the medium beads, specific area of crushed material after temporary baking are adjusted in the above-described range for use, the oxide magnetic material can be obtained without lowering the crushing efficiency or inviting deterioration of the density and permeability of the sintered material.

According to the method as in the ninth aspect of the invention for producing the chip part, since the magnetic material of the oxide magnetic material crushed by the medium beads and the internal conductor are molded and baked in the above-described range, insufficient sintering, diffusion of the electrode material in ferrite may be prevented. Therefore, the deterioration of electro-magnetic property is prevented.

While only certain embodiments of the invention have been specifically described herein, it will be apparent that numerous modifications may be made thereto without departing from the spirit and scope of the invention.

The present invention is based on Japanese Patent Applications No. Hei. 11-232412, Hei. 11-262934, and Hei. 11-262935 which is incorporated herein by reference.

What is claimed is:

1. A method for producing an oxide magnetic material, said method comprising:

mixing and crushing a raw material with a media agitating mill of a wet internal circulation type;

baking the mixed and crushed material; and crushing the baked material with the media agitating mill;

wherein a partially stabilized zirconia is used as medium beads at the time of mixing and crushing the raw material and at the time of crushing the baked material in order to cause $Y_2O_3$ of 0.003 to 0.021 wt % and $ZrO_2$ of 0.06 to 0.37 wt % to be in the oxide magnetic material.

2. The method for producing the oxide magnetic material according to claim 1, wherein the diameter of each of the medium beads is in the range between 0.2 and 5 mm.

3. The method for producing the oxide magnetic material according to claim 1, wherein an agitating rate of the medium beads is in the range between 2.0 and 8.0 m/s.

4. The method for producing the oxide magnetic material according to claim 1, wherein the baked material is crushed so that powders of specific surface area of 6.0 to 15.0 m$_2$/g are obtained.

5. A method for producing a chip part, said method comprising:
  producing an oxide magnetic material, including:
    mixing and crushing a raw material with a media agitating mill of a wet internal circulation type;
    baking the mixed and crushed material; and
    crushing the baked material with the media agitating mill,
    wherein a partially stabilized zirconia is used as medium beads at the time of mixing and crushing the raw material and at the time of crushing the baked material in order to cause $Y_2O_3$ of 0.003 to 0.021 wt % and $ZrO_2$ of 0.06 o 0.37 wt % to be in the oxide magnetic material; and
  forming and baking the oxide magnetic material and an internal conductor at temperature in the range between 880° C. and 920° C.

* * * * *